United States Patent [19]

Ishii

[11] Patent Number: 4,862,312
[45] Date of Patent: Aug. 29, 1989

[54] CIRCUIT BREAKER WITH OVERCURRENT PROTECTION

[75] Inventor: Kazuhiro Ishii, Fukuyamashi, Japan

[73] Assignee: Mitsubishi Denki Kabushiki Kaisha, Tokyo, Japan

[21] Appl. No.: 274,858

[22] Filed: Nov. 22, 1988

[51] Int. Cl.[4] .............................................. H02H 3/093
[52] U.S. Cl. ...................................... 361/96; 361/86; 361/89; 361/97
[58] Field of Search ............................ 361/86, 93–98, 361/102, 18

[56] References Cited

U.S. PATENT DOCUMENTS

| 3,602,783 | 8/1971 | Engle et al. |
| 3,818,275 | 6/1974 | Shimp |
| 4,347,541 | 8/1982 | Chen et al. ......................... 361/97 X |
| 4,375,072 | 2/1983 | Rice ................................... 361/93 X |
| 4,567,540 | 1/1986 | Ruta ...................................... 361/93 |

FOREIGN PATENT DOCUMENTS 55-29931 7/1980 Japan .
60-32211 2/1985 Japan .

Primary Examiner—Todd E. DeBoer
Attorney, Agent, or Firm—Burns, Doane, Swecker & Mathis

[57] ABSTRACT

A circuit breaker device comprises a rectifier circuit connected to the secondary winding of the current transformer to convert the AC secondary current into a unidirectional current. A DC constant voltage power supply circuit is connected across the output terminals of the rectifier circuit and produces positive, negative and intermediate potentials. A time delay circuit powered from the power supply circuit and connected to receive the output signal of said differential amplifier circuit proportional to said unidirectional current and producing a predetermined time delay with respect to a predetermined magnitude of said unidirectional current. An electromagnetic trip coil connected in series with said switch circuit, the series circuit of said electromagnetic trip coil and said switch circuit is connected to be energized by the output of said rectifier circuit. The time delay circuit comprises a long time delay trip circuit which comprises a capacitor charged by a current corresponding to the fault current, and a current compensation circuit for compensating the leak current of said capacitor.

5 Claims, 4 Drawing Sheets

CIRCUIT BREAKER WITH OVERCURRENT PROTECTION

BACKGROUND OF THE INVENTION

This invention relates to a circuit breaker with overcurrent protection tripping.

An example of this type of circuit breaker is shown in Japanese Laid-Open Patent Application No. 32211/1985. It comprises a current transformer for detecting a fault current in a line conductor. The output current of the current transformer is converted into a DC signal by a fullwave rectifier and then supplied to a shunt circuit. The waveform of the signal voltage induced in the shunt circuit is the well-known absolute value waveform. The output signal of the shunt circuit is converted into a signal corresponding to its effective value or average value at a signal conversion circuit.

The output signal of the signal conversion circuit is applied to a fault processing circuit, and if the fault current is found to exceed a predetermined level, a level detection signal is input to a time delay circuit, which performs a predetermined time delay operation and triggers the gate of a thyristor to drive a release-type overcurrent trip coil and open a line contact and interrupt the current in the line conductor.

In this case, a power supply circuit for the fault processing circuit is connected in parallel with the shunt circuit.

In the above arrangement, part of the secondary current of the current transformer, which is used to detect a current, flows through the power supply circuit. As a result, the current flowing through the shunt circuit does not correspond to the current through the AC line, and an error occurs in the level of detection of the fault current. Since the current flowing into the power supply circuit is not fixed, correction of the error in the fault current level detection is difficult.

A measure for improving the accuracy of the fault current level detection is disclosed in Japanese Utility Model Application Publication No. 29931/1980. In this device, however, a capacitor forming part of the time delay circuit is associated with a leak current. In the case of a short time delay trip circuit, the leak current is very small as compared with the current corresponding to the fault current and the leak time is as short as 10msec., so the problem is not serious. In the case of long time delay trip circuit, even when the leak current is as small as 0.5μA, if the current is 1μA the leak current and the charging current equal and the time delay operation is twice that of the rated value. Thus it deviates from the rated value.

SUMMARY OF THE INVENTION

An object of the invention is to solve the above described problems.

Another object of the invention is to provide a circuit breaker with an improved accuracy in the fault current level detection and improved time delay operation.

A circuit breaker device according to the invention comprises:

a line contact inserted in an AC line conductor;

a current transformer for detecting the current flowing through the line contact;

a rectifier circuit connected to the secondary winding of the current transformer to convert the AC secondary current into a unidirectional current;

a DC constant voltage power supply circuit connected across the output terminals of the rectifier circuit and having positive, negative and intermediate output terminals for producing positive, negative and intermediate potentials;

a current detection resistor connected in series with said power supply circuit;

a differential amplifier circuit powered from the output of said power supply circuit and converting a voltage drop across said current detection resistor which is proportional to said unidirectional current into an output signal having a potential which is between said positive and negative potentials and takes the intermediate potential as a reference;

a time delay circuit powered from said power supply circuit and connected to receive the output signal of said differential amplifier circuit proportional to said unidirectional current and producing a predetermined time delay with respect to a predetermined magnitude of said unidirectional current;

a switch circuit operated from an open-state to a closed-state in accordance with the output of said time delay circuit;

an electromagnetic trip coil connected in series with said switch circuit, the series circuit of said electromagnetic trip coil and said switch circuit being connected to be energized by the output of said rectifier circuit;

a trip mechanism excited when said electromagnetic trip coil is energized;

wherein said time delay circuit comprises a long time delay trip circuit which comprises a capacitor charged by an current corresponding to the fault current, and a current compensation circuit for compensating the leak current of said capacitor.

DETAILED DESCRIPTION OF THE EMBODIMENTS

Figure 1:
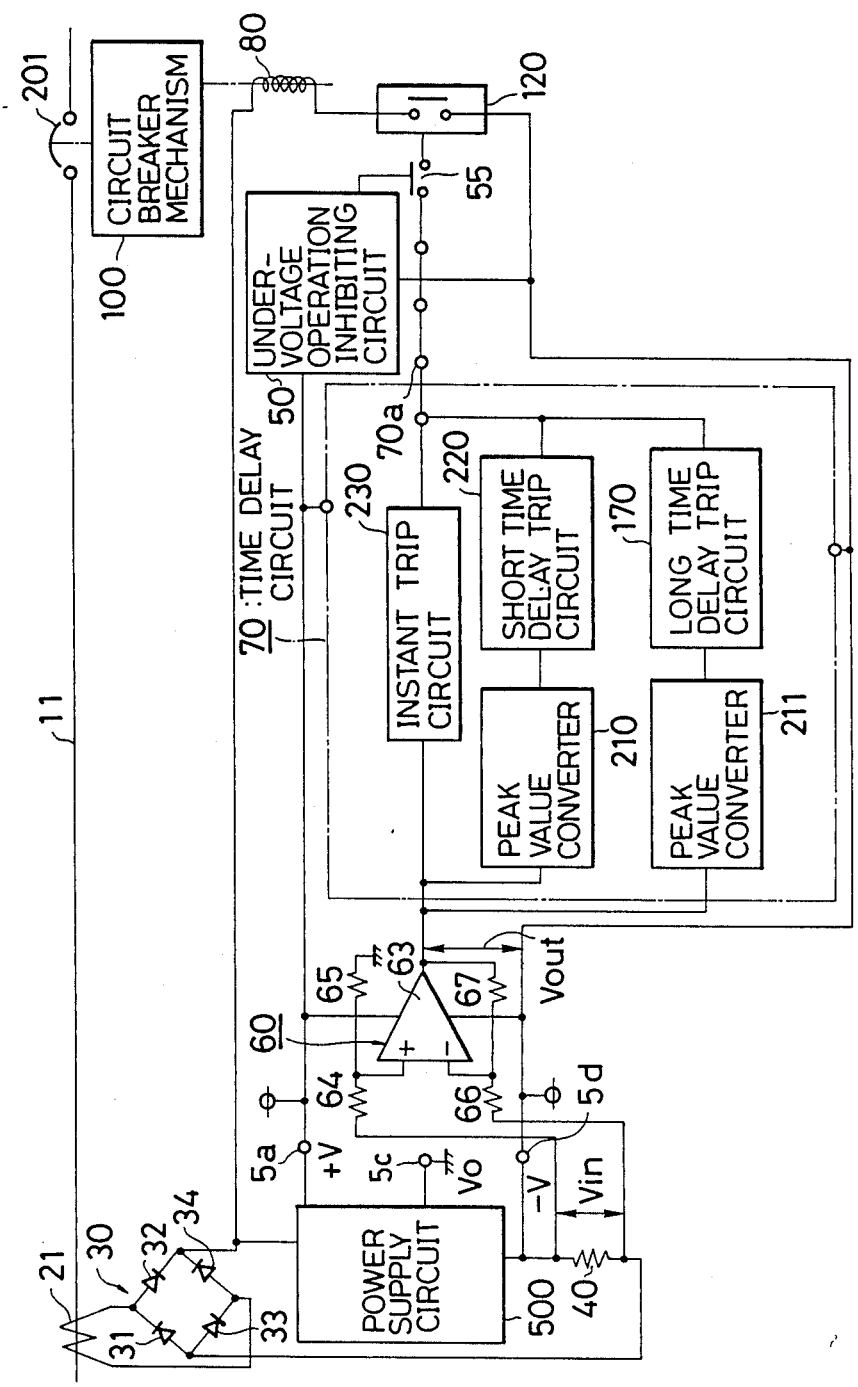
FIG. 1 is a circuit diagram showing a circuit breaker device of an embodiment of the invention.

A circuit breaker of an embodiment of the invention shown in FIG. 1 is associated with a line conductor 11 of an electrical power system or circuit to be protected. The electrical system may be of any desired type such as a single phase system of a polyphase system. In FIG. 1, only a single line conductor is illustrated for the purpose of simplicity.

A circuit breaker or circuit interrupter CB comprising a circuit breaker mechanism 100 and a line contact 201 is provided for isolating or segregating different portions of the electrical system under certain abnormal or fault conditions, such as an overcurrent condition. The circuit breaker mechanism 100 may comprise an electromagnetic trip coil 80 which, when energized while the line contact 201 is closed, actuates or results in a tripping or opening operation of the line contact 201.

In order to obtain an output current which is substantially proportional to the line current in the line conductor 11, a current transformer 21 is provided, as shown in FIG. 1. The current transformer 21 is energized in accordance with the line current in the line conductor 11.

The current transformer 21 has a secondary, output winding 21b connected to AC terminals of a bridge-type fullwave rectifier circuit 30, which rectifies the secondary output current of the current transformer 21. The rectifier circuit 30 comprises a series circuit of diodes 31 and 32 and another series circuit of diodes 33 and 34.

A power supply circuit 500 is provided to receive the output of the rectifier circuit 30. More specifically, a first input terminal 5b of a power supply circuit 500 is connected the positive DC output terminal of the rectifier circuit 30. The power supply circuit 500 has a positive output terminal 5a, a negative output terminal 5d and an intermediate terminal 5c. The intermediate terminal 5c is grounded. The potential on the positive output terminal 5a is positive with respect to and 12 V higher than the intermediate terminal 5c. The potential on the negative terminal 5d is negative with respect to and about 3 V lower (more negative) than the intermediate terminal 5c. The negative output terminal 5d is connected through a current detection resistor 40 to a negative DC output terminal of the rectifier circuit 30. Accordingly a fullwave rectified current corresponding to the line current in the line conductor 11 flows through the detection resistor 40.

Figure 4:
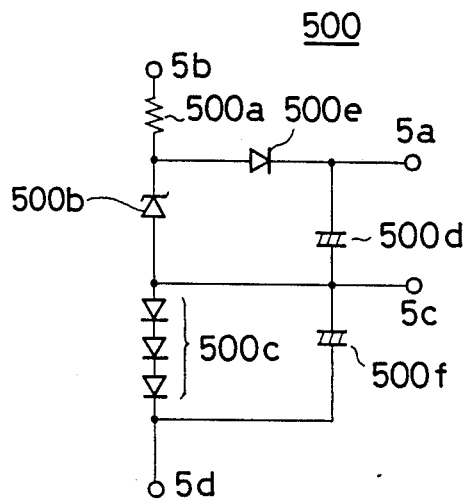
FIG. 4 is a diagram showing an example of the power supply circuit incorporated in the circuit breaker device according to the invention.

An example of the power supply circuit 500 is shown in FIG. 4. As illustrated, it comprises series connection of a resistor 500a and a Zener diode 500b connected between the terminals 5b and 5c. The Zener diode 500b has a Zener voltage of about 12 V. The power supply circuit 500 further comprises a series connection of three diodes 500c providing a forward voltage drop across them which is about 2 V and connected between the terminals 5d and 5c, a diode 500e having its anode connected to the junction between the resistor 500a and the Zener diode 500b and its cathode connected to the terminal 5a, and a capacitor 500d connected between the terminals 5a and 5c, and another capacitor 500f connected between the terminals 5c and 5d. The capacitors 500d and 500f stabilize the voltage across the terminals 5a, 5c and 5d. The diode 500e prevents discharge of the capacitors 500d and 500f.

A differential amplifier circuit 60 amplifiers the voltage drop across the current detection resistor 40 and at the same time level-shifts the potentials which is below the ground potential, into a signal having the intermediate potential $V_o$ of the power supply circuit 500 as a reference. In other words, the differential amplifier circuit 60 produces, across the output signal line and a ground line, an output signal $V_o$ which corresponds in magnitude to the voltage drop across the current detection resistor.

The differential circuit 60 comprises an operational amplifier 63 and four resistors 63, 65, 66 and 67. The power for the differential amplifier circuit 60 is supplied from the power supply circuit 500. The input terminals of the differential circuit 60 are connected to both ends of the current detection resistor 40.

The gain A of the differential amplifier circuit 60 is given by:
A = Vout/Vin = Rout/Rin, where Rin = R64 = R66, Rout = R65 = R67.

Here, R64, R65, R66 and R67 are resistances of the resistors 64, 65, 66 and 67.

In order that the differential amplifier circuit 60 operates properly, the input potentials $V_1$ and $V_2$ should be between the positive and the negative potentials supplied to its positive and negative power supply terminals.

A time delay circuit 70 comprises a instant trip circuit 170, a short time delay trip circuit 220 and a long time delay trip circuit 230. The output terminals of the long time delay trip circuit 230, the short time delay trip circuit 220, and the trip circuit 170 are connected in parallel with each other to constitute output terminals 70a.

The instant trip circuit 230 is connected to the output terminal of the differential amplifier circuit 60. Connected parallel with the instant trip circuit 230 are a series connection of a peak value converter circuit 210 and the short time delay trip circuit 220, and another series connection of a peak value converter circuit 211 and the instant trip circuit 170. Each of the peak value converter circuits 210 and 211 receives the input signal of the fullwave rectified waveform into a continuous DC signal having a magnitude proportional to the peak value of the input signal.

The electromagnetic trip coil 80 is connected through a switch 120 across the positive and negative DC output terminals of the rectifier circuit 30. An armature, not shown, driven by the electromagnetic trip coil 80 is mechanically coupled through the circuit breaker mechanism 100 to the line contact 201. When the switch 120 turns from the open-state to the closed-state, the line contact 201 is opened.

An undervoltage operation inhibiting circuit 50 is connected between the positive and negative output terminals 5a and 5b of the power supply circuit 500. A switch 55 is driven by the undervoltage operation inhibiting circuit 50.

Figure 2:
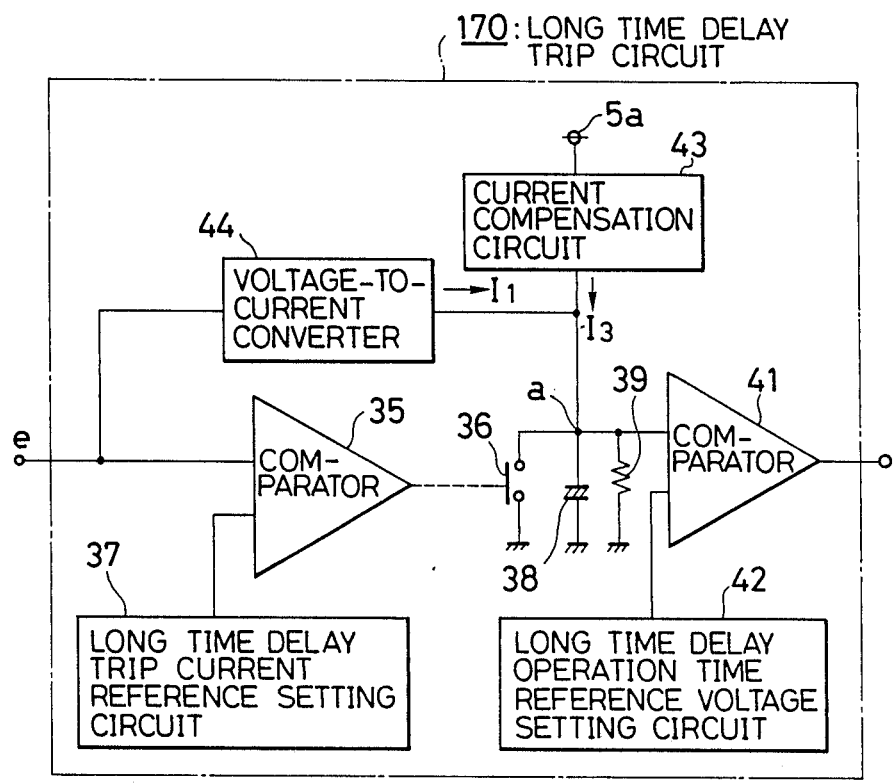
FIG. 2 is a circuit diagram showing an example of a long time delay trip circuit.

FIG. 2 shows an example of the long time delay trip circuit 170. As illustrated, it comprises a comparator 35 receiving at one input terminal thereof an output e of the peak value converter circuit 211. A long time delay trip current reference voltage setting circuit 37 is connected to the other output terminal of the comparator 35 to provide a rated current value as a reference. A switch 36 is driven by the comparator 35 and is normally closed but is opened in case of overcurrent.

A long time delay trip capacitor 38 and a discharge resistor 39 are connected in parallel with the switch 36. The discharge resistor 39 is provided to discharge the capacitor 38 with a predetermined time constant. The time constant of the resistor 39 and the capacitor 38 is so set as to be equal to the time constant of heat dissipation of the line conductor. The junction node a connecting the capacitor 38 and the resistor 39 is connected to the output of a voltage-to-current converter circuit 44. The input of the voltage-to-current converter circuit 44 is connected to receive the output e of the peak value converter circuit 211. The output of the voltage-to-current converter circuit 44 is proportional to the square of the input signal.

The output current I1 of the voltage-to-current converter circuit 44 flows into the capacitor 38 for charging of the capacitor 38.

The junction node a is also connected to an input terminal of a comparator 41. A long delay time reference voltage setting circuit 42 is connected to the other input terminal of the comparator 41 to provide a potential corresponding to the long time delay operation time which becomes the reference for the comparator 41.

A current compensation circuit 43 is connected between the junction node a and the positive DC output terminal 5a. The current compensation circuit 43 serves to compensate the leak current of the capacitor 38. The leak current of the capacitor 35 is considered to be not more than about 0.5μA, and the current compensation circuit 43 comprises a constant-current source which supplies 0.5μA for compensating the maximum leak current.

Figure 5:
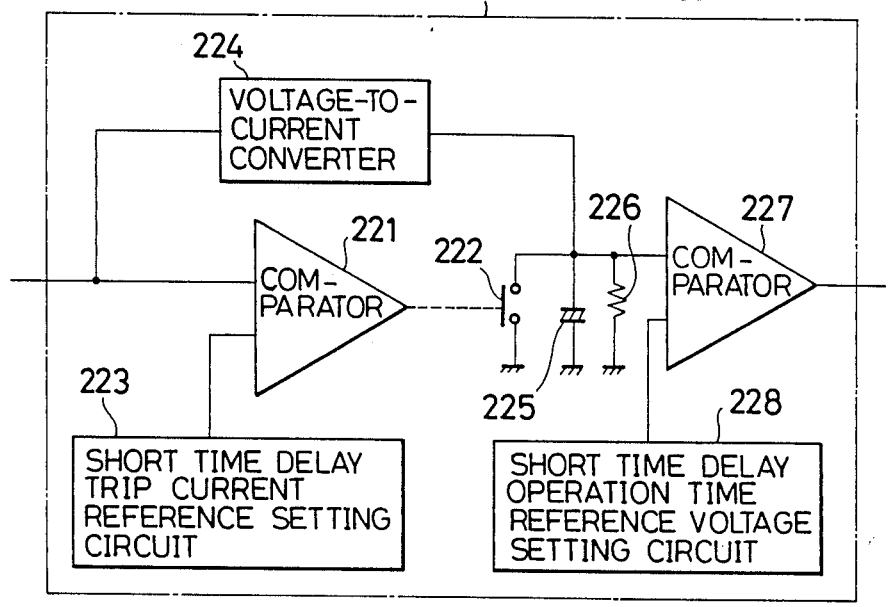
FIG. 5 is a diagram showing an example of a short time delay trip circuit.

A short time delay trip circuit 220 is shown in FIG. 5. It is similar to the long time delay trip circuit 170. As illustrated, it comprises a comparator 221, a switch 222, a short time trip current setting circuit 223, a voltage-to-current converter circuit 224, a capacitor 226, a comparator 227 and a short time delay time reference voltage setting circuit 228, which are similar to the comparator 35, a switch 36, the voltage-to-current converter circuit 44, a long time delay trip current reference voltage setting circuit 37, a capacitor 38, the resistor 39, the comparator 41 and the long time delay time reference voltage setting circuit 42. However, the output of the voltage-to-current converter 224 is proportional to its input.

The operation of the above described arrangement will now be described.

When a current flows through the AC line conductor 11, a secondary current flows through the secondary winding of the current transformer 21. The magnitude of the secondary current is determined by the transformation ratio. The secondary current is converted into a unidirectional current by the rectifier circuit 30. The output current from the rectifier circuit 30, which is a fullwave rectified current corresponding to the AC line conductor 11, passes through the power supply circuit 500 and the current detection resistor 40.

When a fullwave rectified current flows through the power supply circuit 500, the output terminals 5a and 5d of the power supply circuit 500 will produce potentials +V (= +about 12 V) and -V (= -about 2 V), respectively, if the potential on the intermediate terminal 5c is taken as a reference Vo (= OV).

The differential amplifier circuit 60 is powered from the power supply circuit 500, and the input to the differential amplifier circuit 60 is supplied from across the current detection resistor 40. The gain A of the differential amplifier circuit 60 is given by :

$$A = V_{out}/V_{in} = R_{out}/R_{in}$$

as was stated earlier.

Figure 3:
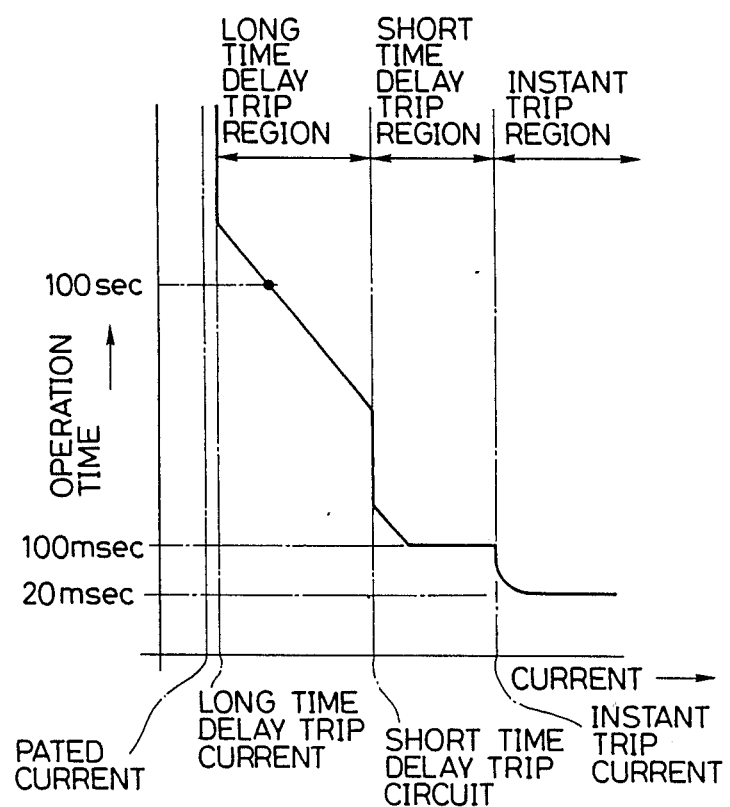
FIG. 3 is a diagram showing the operational characteristics of the circuit breaker device according to the invention.

When the line current as represented by the output of the differential amplifier circuit 60 exceeds the instant trip current region, the short time delay trip region and the long time delay trip region, as shown in FIG. 3, that is when the magnitude of the line current as represented by the magnitude of the differential amplifier circuit 60 exceeds or continue to exceed an overcurrent value for a time along the characteristics curve, an output signal is produced from the corresponding one of the long time delay trip circuit 230, short time delay trip circuit 220 or the instant trip circuit 170.

The output of the peak value converter circuit 211 is input to the comparator 35, shown in FIG. 2, and when the this output exceeds the output of the long time delay trip current reference setting circuit 37, the switch 36 is driven by the comparator 35 from the closed state to the open state permitting charging of the capacitor 38. The time delay operation is thereby started.

The voltage-to-current converter circuit 44 converts the input signal voltage into a current signal. Its output current I1 is used for the charging of the capacitor 38. When the voltage on the capacitor 38 is increased because of the charging and exceeds the output voltage of the long time delay operation time reference voltage setting circuit 42, an output signal is produced from the time delay circuit 70 as an indication of expiration a long delay time. With higher input signal voltage e the operation time is shorter.

Generally, the long time delay trip circuit 170 is prescribed to operate when the current flowing through the line contact 201 is within 125% of the rated current.

When the current I1 corresponding to the fault current flows into the capacitor 38, a leak current of the capacitor 38 flows. A compensating current I3 corresponding to the leak current is supplemented from the current compensation circuit 43. As a result, the capacitor 38 is charged at a rate corresponding to the magnitude of the fault current I1, with the effect of the leak current being removed. An accurate time delay operation is thereby achieved.

The output signal of the time delay circuit 70 passes through the switch 55, now closed, of the undervoltage operation inhibiting circuit 50 and triggers the switch 120 thereby to turn the switch 120 from the open-state to the closed-state, which in turn excites the electromagnetic trip coil 80. the electromagnetic trip coil 80 then operates the line contact 201 from the closed-state to the open-state thereby to interrupt the fault current.

Where the current flowing through the line contact 201 is smaller than 10 to 20% of the rated current, the output voltage of the power supply circuit 500 is insufficient for the operation of the time delay circuit 70. In such a state, the time delay circuit 70 may produce an erroneous output. To prevent such an erroneous output, the undervoltage operation inhibiting circuit 50 is provided. The undervoltage operation inhibiting circuit 50 opens the switch 55 when the current through the line contact 201 is small and the voltage across terminals 5a and 5b is low.

In the embodiment described, the electrical system is shown to be a single phase AC system. But the invention is also applicable to multiple phase systems.

As has been described, according to the invention, a total current corresponding to the current through the AC line conductor flows through the power supply circuit and the current detection resistor, so that the accuracy of current detection is improved.

Moreover, a current compensation circuit is provided in the long time delay trip circuit to compensate for the leak current through the discharge resistor. A current accurately corresponding to the fault current therefore flows into the capacitor for the charging, so that the time delay operation is accurate.

What is claimed is:

1. A circuit breaker device comprising:
   a line contact inserted in an AC line conductor;
   a current transformer for detecting the current flowing through the line contact;
   a rectifier circuit connected to the secondary winding of the current transformer to convert the AC secondary current into a unidirectional current;
   a DC constant voltage power supply circuit connected across the output terminals of the rectifier circuit and having positive, negative and intermediate output terminals for producing positive, negative and intermediate potentials;

a current detection resistor connected in series with said power supply circuit;

a differential amplifier circuit powered from the output of said power supply circuit and converting a voltage drop across said current detection resistor which is proportional to said unidirectional current into an output signal having a potential which is between said positive and negative potentials and takes the intermediate potential as a reference;

a time delay circuit powered from said power supply circuit and connected to receive the output signal of said differential amplifier circuit proportional to said unidirectional current and producing a predetermined time delay with respect to a predetermined magnitude of said unidirectional current;

a switch circuit operated from an open-state to a closed-state in accordance with the output of said time delay circuit;

an electromagnetic trip coil connected in series with said switch circuit, the series circuit of said electromagnetic trip coil and said switch circuit being connected to be energized by the output of said rectifier circuit;

a trip mechanism excited when said electromagnetic trip coil is energized;

wherein said time delay circuit comprises a long time delay trip circuit which comprises a capacitor charged by an current corresponding to the fault current, and a current compensation circuit for compensating the leak current of said capacitor.

2. A device according to claim 1, wherein said series circuit of said electromagnetic trip coil and said switch circuit is connected across the input terminals of said power supply circuit.

3. A device according to claim 1, wherein said time delay circuit further comprises a peak value converter circuit converting the peak value of the output of said differential amplifier circuit into a DC signal having a magnitude corresponding to the peak value of the output of said differential amplifier circuit.

4. A device according to claim 3, wherein said long time delay circuit further comprises:

a first comparator comparing the output of said peak value converter circuit with a predetermined rated current reference voltage, and produces a signal when the former exceeds the latter;

a switch that is connected across said capacitor, is normally closed and is closed when said comparator produces said signal;

a voltage-to-current converter circuit for converting the output of said peak value converter circuit into a current proportional to the square of said output of said peak value converting circuit; and a second comparator for comparing the voltage on said capacitor with a predetermined time delay operation reference voltage;

whereby the output of said second comparator constitutes the output of said long time delay circuit.

5. A device according to claim 1, wherein said current compensation circuit comprises a constant-current source means for supply a current equal to a maximum leak current of said capacitor.

* * * * *